US008471449B2

(12) United States Patent
Niessner et al.

(10) Patent No.: US 8,471,449 B2
(45) Date of Patent: Jun. 25, 2013

(54) ATTACHING A PRECIOUS METAL COMPONENT TO SPARK PLUG ELECTRODE AND SPARK PLUG HAVING THE SAME

(75) Inventors: Werner Niessner, Steinheim (DE); Christophe Houlle, Reventin-Vaugis (FR)

(73) Assignee: Federal-Mogul Ignition GmbH, Weisbaden (DE)

( * ) Notice: Subject to any disclaimer, the term of this patent is extended or adjusted under 35 U.S.C. 154(b) by 76 days.

(21) Appl. No.: 13/082,218

(22) Filed: Apr. 7, 2011

(65) Prior Publication Data

US 2012/0086326 A1 Apr. 12, 2012

(30) Foreign Application Priority Data

Apr. 9, 2010 (DE) ........................ 10 2010 014 325

(51) Int. Cl.
*B23K 26/20* (2006.01)
*B23K 11/16* (2006.01)

(52) U.S. Cl.
USPC ... 313/141; 313/144; 123/169 R; 123/169 EL

(58) Field of Classification Search
CPC ....... B23K 26/063; B23K 26/28; B23K 35/322
USPC ............... 313/141–145; 123/169 R, 169 EL, 123/32, 41
See application file for complete search history.

(56) References Cited

U.S. PATENT DOCUMENTS

| | | | | |
|---|---|---|---|---|
| 4,514,657 | A | 4/1985 | Igashira et al. | |
| 5,478,265 | A * | 12/1995 | Matsutani et al. | 445/7 |
| 5,497,045 | A * | 3/1996 | Matsutani et al. | 313/141 |
| 5,811,915 | A | 9/1998 | Abe et al. | |
| 6,630,771 | B1 * | 10/2003 | Ulm et al. | 313/144 |
| 6,750,598 | B2 | 6/2004 | Hori | |
| 6,853,116 | B2 | 2/2005 | Hori et al. | |
| 7,187,110 | B2 | 3/2007 | Suzuki | |
| 7,230,370 | B2 | 6/2007 | Kato | |
| 7,282,844 | B2 | 10/2007 | Kanao et al. | |
| 7,368,864 | B2 | 5/2008 | Suzuki | |
| 7,839,064 | B2 | 11/2010 | Yoshida et al. | |
| 7,923,909 | B2 * | 4/2011 | Tinwell | 313/141 |
| 8,079,136 | B2 * | 12/2011 | Walker et al. | 29/611 |
| 2003/0085202 | A1 | 5/2003 | Niessner | |
| 2004/0129683 | A1 | 7/2004 | Torii et al. | |
| 2006/0261046 | A1 * | 11/2006 | Scotchmer | 219/120 |
| 2006/0276097 | A1 | 12/2006 | Suzuki et al. | |
| 2007/0103046 | A1 | 5/2007 | Tinwell | |
| 2007/0277764 | A1 * | 12/2007 | Ito et al. | 123/169 R |
| 2008/0174221 | A1 | 7/2008 | Tinwell | |

FOREIGN PATENT DOCUMENTS

| | | |
|---|---|---|
| WO | 2008055483 | 5/2008 |

* cited by examiner

*Primary Examiner* — Tracie Y Green
(74) *Attorney, Agent, or Firm* — Reising Ethington P.C.

(57) ABSTRACT

Method for manufacturing a spark plug comprising an inner conductor, an insulator enclosing the inner conductor, a spark plug body enclosing the insulator, and two electrodes, the first electrode being a center electrode connected to the inner conductor in an electrically conductive manner, and the second electrode being a ground electrode connected to the spark plug body in an electrically conductive manner, with a separately prefabricated precious metal component positioned on one of the electrodes and connected to the electrode by way of resistance welding, and subsequently affixed by way of laser or electron beam welding, so that the precious metal component extends like a heel beyond the electrode surface next to the precious metal component. The precious metal component, a ball is shaped by stamping after resistance welding and before laser or electron beam welding, wherein at least one region of the ball protruding from the electrode surface is reshaped.

15 Claims, 4 Drawing Sheets

Figure 1:
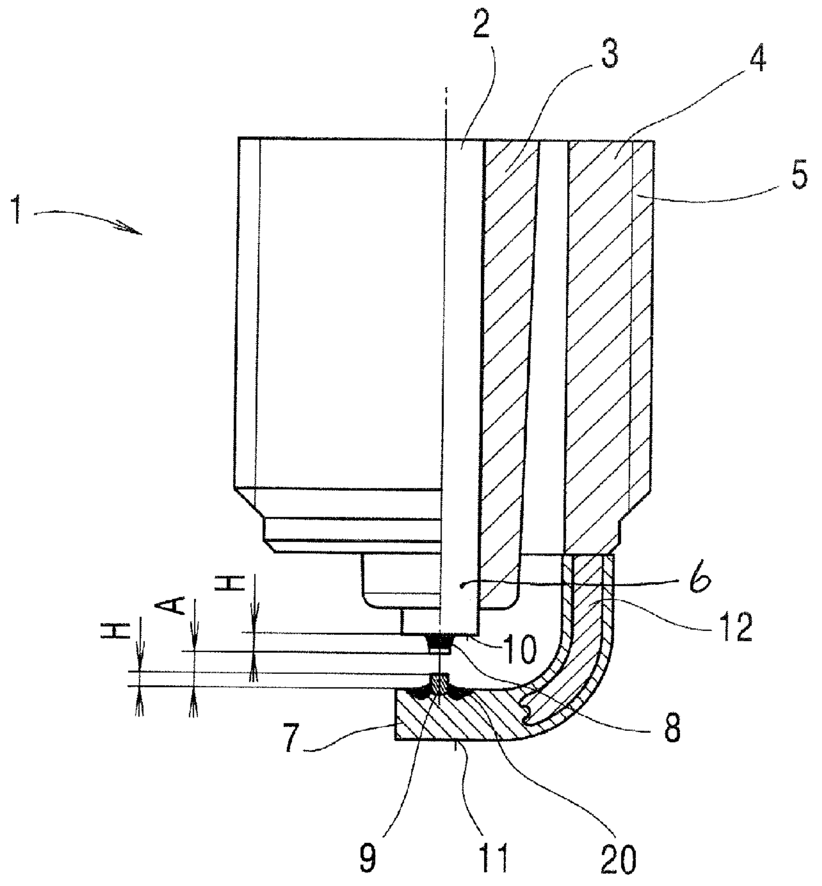

ATTACHING A PRECIOUS METAL COMPONENT TO SPARK PLUG ELECTRODE AND SPARK PLUG HAVING THE SAME

The present invention relates to a method for manufacturing a spark plug that comprises an inner conductor, an insulator enclosing the inner conductor, a spark plug body enclosing the insulator, and two electrodes, of which the first electrode is a center electrode connected to the inner conductor in an electrically conductive manner, and the second electrode is a ground electrode connected to the spark plug body in an electrically conductive manner, in which a separately prefabricated precious metal component is positioned on one of the electrodes, is thereafter connected to the electrode by way of resistance welding, and subsequently is affixed by way of laser or electron beam welding, so that the precious metal component extends like a heel beyond the electrode surface next to the precious metal component.

A method of this type is known from DE 196 41 856 B4. In the case of the known method, a small precious metal plate having the shape of a cylinder is used as the precious metal component. The precious metal plate is pressed into the electrode during resistance welding, thereby resulting in an overhanging section around an outer periphery of the precious metal plate, which holds the precious metal plate on the electrode. The overhanging section, which surrounds the precious metal component in the manner of a collar, is then connected to the precious metal component by way of laser or electron beam welding. Given that the electrode material is deformed around the outer periphery of the precious metal plate into the shape of a section overhanging in the manner of a collar, it is necessary when performing laser or electron beam welding to melt on a relatively large quantity of the electrode material, namely the entire section of the electrode material projecting in the manner of a collar, before a region of the precious metal plate can even be melted on. This procedure is laborious. In addition, the handling of the precious metal component is relatively complex when placing and positioning on the electrode since care must be taken to orient the precious metal plate correctly.

The problem addressed by the invention is that of simplifying the manufacture of a spark plug.

The problem is solved in the case of the method of the initially described type by using a ball as the precious metal component, and by shaping the precious metal component by stamping after resistance welding and before laser or electron beam welding, wherein at least one region of the ball protruding from the electrode surface is reshaped.

The new method simplifies the manufacture of a spark plug in a plurality of ways. Due to the use of a spherical precious metal component as a semi-finished product, to be connected to the electrode, the step of orienting the precious metal component when placing and positioning the ball on the electrode is eliminated entirely. The ball is symmetrical in all directions and can therefore be placed onto the electrode with any orientation. As a result, placement and positioning on the electrode are very simple. The handling of the spherical precious metal components before the positioning thereof on the electrode, in particular when supplied and isolated in a device for manufacturing the spark plug, is likewise very simple. Balls can be manufactured very easily and economically.

A further advantage of the use of a ball as the precious metal component is that the amount of material used for the precious metal component is minimized. The use of a ball makes it possible to fulfill the objective of using the precious metal component—namely that of protecting the electrode in order to reduce wear on the spark plug—particularly successfully using a very small quantity of precious metal. The precious metal component does not need to contain an excessive quantity of precious metal which subsequently does not help to protect the electrode against wear.

The method according to the invention is very well suited for equipping the ground electrode as well as the center electrode with a precious metal. Of course it is possible to also equip both electrodes of a spark plug with a precious metal component.

A spark plug comprising a precious metal component projecting from the electrode surface has the advantage that less voltage is required to create a spark. A projection relative to the surface of the electrode surrounding the precious metal component is provided. Advantageously the projection is designed like a heel or as a type of step. The projecting surface of the precious metal component does not transition evenly into the surface of the electrode. A shoulder is provided in the region of the transition of the projecting precious metal component into the surface of the electrode. The shoulder is preferably step-shaped. It can be slightly rounded. The precious metal component can comprise an edge in the rim region thereof, before the surface thereof transitions into the electrode surface, to promote the creation of an arc.

The shaping of the precious metal component by stamping has the advantage that the spherical ball surface is reshaped in a way that is optimized for spark creation and the service life of the spark plug. Since the stamping is carried out after the resistance welding, the spherical precious metal component is already connected to the electrode during the stamping process, thereby ensuring that it will not lose its position.

It is advantageous for the ball to be shaped by stamping a compression punch that presses onto the ball in the direction of the electrode, and for the region of the sphere projecting from the electrode surface to thereby be reshaped such that the precious metal component ultimately projects from the electrode surface by a predefined height. The predefined height by which the precious metal component projects from the electrode surface next to the precious metal component is a setpoint value that is selected on the basis of the desired properties of the spark plug, in particular in regard to ignition voltage and service life. The compression punch is advanced onto the electrode until the desired height of the projecting precious metal component results. It is particularly advantageous when a region of the ball that projects from the electrode surface is shaped by stamping into a shape of a substantially planar surface, which in particular extends approximately parallel to the electrode surface. The formation of a substantially planar surface out of the originally spherical ball surface creates an edge on the precious metal component that surrounds the substantially planar surface and improves spark creation.

According to a further embodiment of the invention, it is advantageous for a region of the ball projecting from the electrode surface to be shaped by stamping into the shape of a jacket surface of a cone, a truncated cone, or a cylinder. As a result, the precious metal component projects from the electrode surface particularly well in the form of a heel-like step. It is particularly advantageous when the precious metal component in the region projecting from the electrode surface is reshaped as a truncated cone. A truncated cone enables good spark formation given low spark voltage to be combined particularly well with a long service life, while simultaneously ensuring ease of manufacture by way of the stamping process.

According to a further embodiment it can be advantageous for a ridge to be integrally formed during stamp-molding on that end of the conical or cylindrical region facing the electrode. In this manner, a ridge-shaped region forms on the precious metal component, the diameter of which is greater than that of the cylindrical or conical region. The ridge of the precious metal component can be easily melted and connected to the basic material of the electrode in the subsequent laser or electron beam welding step. The result is a particularly secure connection of the precious metal component to the electrode, which does not come loose even in the presence of high stresses due to temperature fluctuations.

Advantageously, the compression punch used for shaping by stamping has a predefined shape in the region thereof that reshapes the ball, which shape corresponds to the desired final form of the precious metal component. The compression punch is shaped—in the region thereof that reshapes the ball—as a "die" or a "header", as it is known from the field of riveting, to impart the desired shape of the finished precious metal component to the region of the ball projecting from the electrode surface, preferably in one working step. The stamping process is simplified as a result.

Preferably a hollow welding electrode is used for the positioning and resistance welding of the ball, which positions the ball on the ground electrode or the center electrode of the spark plug and welds it thereto. The tip of the welding electrode preferably has the shape of a calotte. A channel is disposed in the tip, to which a vacuum can be applied to suction the ball onto the welding electrode. Using a welding electrode of this type, the ball can be removed from a magazine very easily and then positioned on the spark plug electrode, where it is then resistance-welded directly.

To ensure good fixation of the precious metal component, it is advantageous for the laser or electron beam to extend approximately at a right angle to the electrode surface during laser or electron beam welding. As a result, the precious metal component shaped by stamping can be connected to the electrode very easily around the entire circumference thereof.

The invention furthermore relates to a spark plug that is manufactured using the method according to the invention. In regard to the spark plug it is preferably provided that the precious metal component projects from the electrode surface next to the precious metal component by a height of approximately 0.1 mm to 1.0 mm, particularly preferably by a height of approximately 0.2 mm to 0.6 mm. Advantageously a region of the precious metal component projecting from the electrode surface has a diameter of approximately 0.3 mm to 1.5 mm, which particularly preferably lies in the range of approximately 0.4 mm to 1.0 mm.

The precious metal component is preferably composed of platinum or a platinum alloy. A ball composed of platinum or a platinum alloy has sufficiently great ductility and is therefore particularly easy to reshape by way of the stamping process.

Further advantages and features of the invention will be apparent from the subsequent description of a few embodiments.

Figure 2:
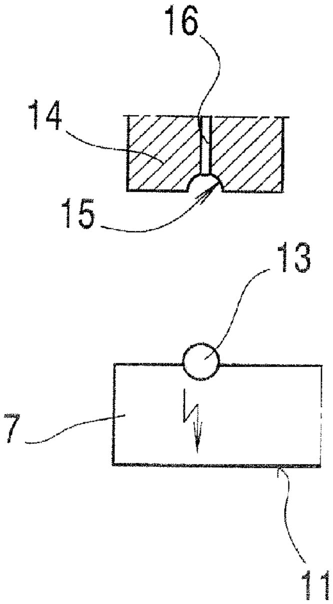
Figure 3:
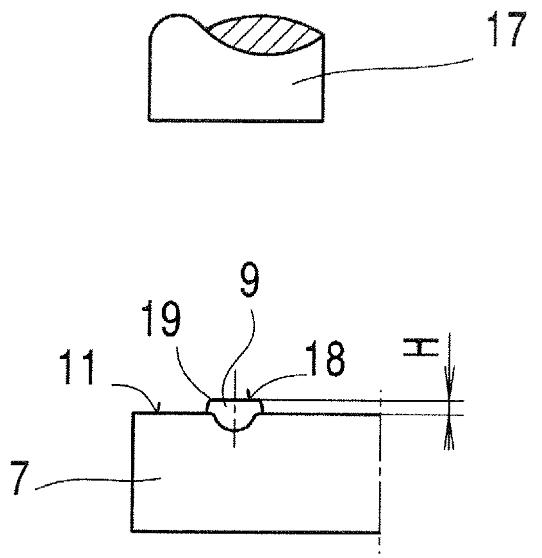
Figure 4:
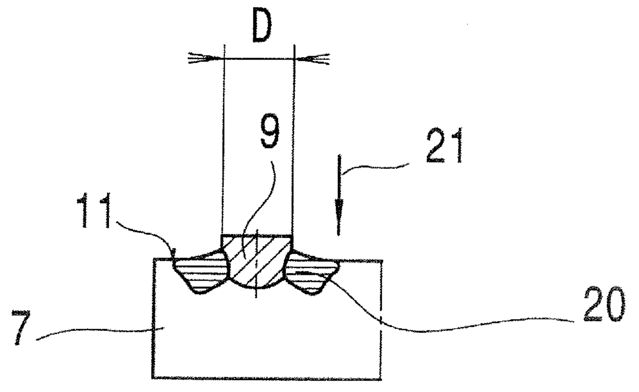
Figure 5:
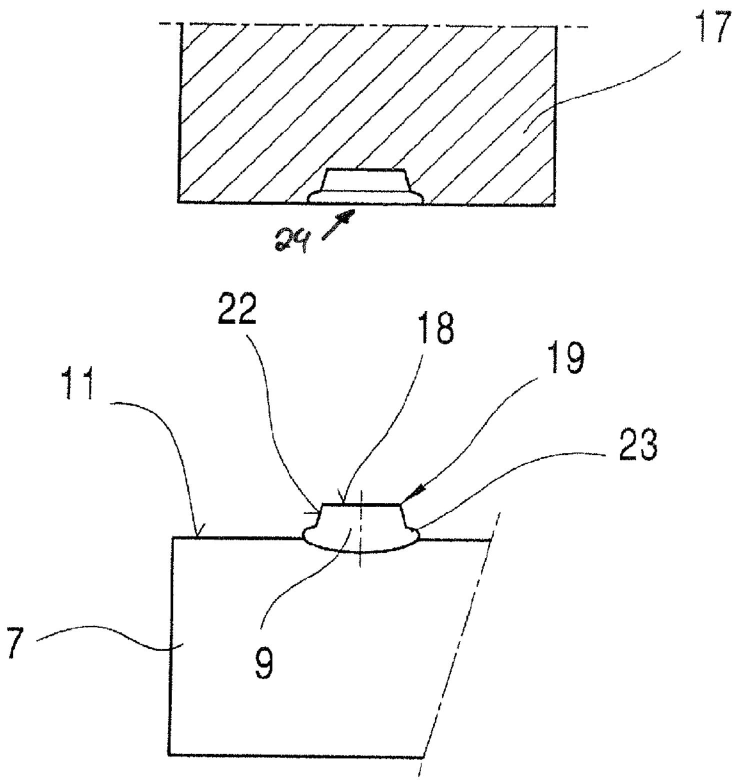
Figure 6:
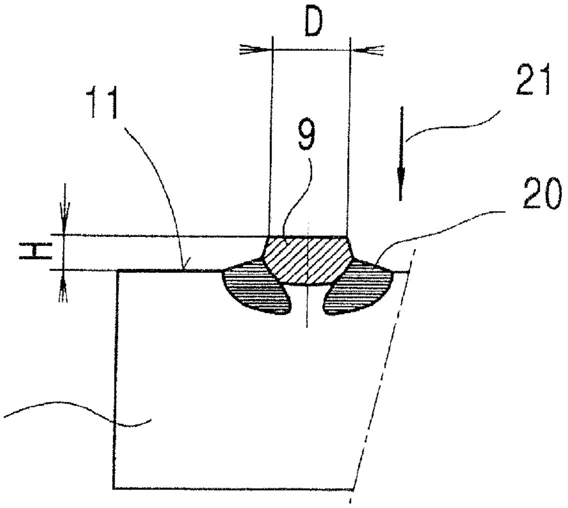
Figure 7:
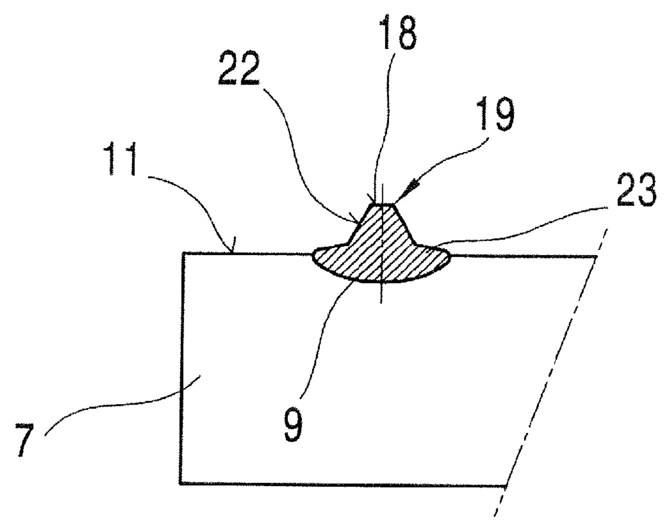
Figure 8:
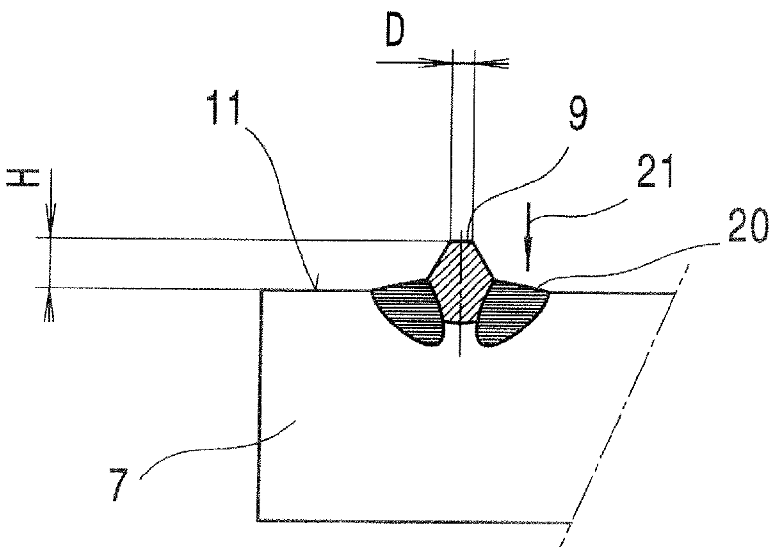

In the drawings:

FIG. 1 shows a partial depiction of a spark plug, in an enlarged and partial cross-sectional view, FIG. 2 shows a further enlarged subregion of the ground electrode of the spark plug depicted in FIG. 1 during resistance welding of a precious metal component, FIG. 3 shows a view of the ground electrode similar to FIG. 2, during shaping of the precious metal component by stamping, FIG. 4 shows a view of the ground electrode similar to FIG. 2, during laser welding of the precious metal component, FIG. 5 shows a view similar to FIG. 3, of a variant of shaping by stamping, FIG. 6 shows a view of the variant of FIG. 5 during laser welding, FIGS. 7 and 8 show depictions similar to FIGS. 5 and 6 of a further variant with a different shaping of the precious metal component.

Spark plug 1 shown in FIG. 1 contains an inner conductor 2 enclosed by an insulator 3. A spark plug body 4 which encloses insulator 3 and houses it is provided. A thread 5 is provided on the outer surface of spark plug body 4. The spark plug contains two electrodes 6 and 7. First electrode 6 is a center electrode which is connected to inner conductor 2 in an electrically conductive manner. Second electrode 7 is a ground electrode which is connected to spark plug body 4 in an electrically conductive manner. A precious metal component 8 is attached to center electrode 6, and a precious metal component 9 is attached to ground electrode 7. Precious metal component 8 projects in a heel-like manner having a height H from a surface 10 of electrode 6 in a region that encloses the precious metal component 8. The precious metal component 9 likewise projects from surface 11 of electrode 7 in a heel-like manner having a height H. The ground electrode 7 is disposed above the center electrode 6 in the manner of a front electrode, so that precious metal components 8 and 9 are separated by a distance A and form a spark gap.

Spark plug 1 can be inserted into an internal combustion engine by way of thread 5 thereof in a manner known per se. The region of spark plug 1 comprising electrodes 6 and 7 then extends into a combustion chamber of the internal combustion engine, where it can ignite a fuel-air mixture.

Ground electrode 7 is composed of a nickel alloy, at least in the region of electrode surface 11 next to precious metal component 9. Ground electrode 7 can comprise a jacket composed of a nickel alloy being disposed around a copper core 12. Precious metal components 8 and 9 are preferably composed of platinum or a platinum alloy and form anchor points having a small surface area and inverse properties which determine the voltage requirement and ignition site. The material combination of platinum/nickel ensures that the arc of the spark occurs on the precious metal component composed of platinum. At that point there is a great work function, a low evaporation rate, and practically no oxidation. The further discharge of the spark in the arc and flow phase immediately transitions into the regions—which are designed as sacrificial regions—of electrodes 6 and 7 which are composed of nickel, where a low work function is required. The effective spark length therefore increases relative to distance A between electrodes 6 and 7 and promotes the combustion of the mixture in the combustion chamber of the internal combustion engine. The voltage required to create the spark of spark plug 1 is determined by distance A, however. It can be reduced without impairing the combustion of the fuel mixture, thereby enabling the voltage required by the spark plug to be reduced. The result thereof is an increased service life of spark plug 1.

Spark plug 1 is manufacturing using the method according to the invention, wherein, in particular, precious metal component 9 is attached to ground electrode 7 in the manner according to the invention. The invention is described in the following with reference to the example of attaching precious metal component 9 to ground electrode 7. Precious metal component 8 can be attached to center electrode 6 in an analogous manner. A separate description will be omitted to prevent repetition. The manufacturing process is described in the following with reference to FIGS. 2 to 8. In those figures, the same reference characters are used to label parts that are the same as in FIG. 1.

In manufacturing spark plug 1, ground electrode 7 is provided with precious metal component 9. A separately prefabricated ball 13 is used for precious metal component 9, as shown in FIG. 2. The separately prefabricated ball 13 can be removed from a magazine, which is not depicted, using a hollow welding electrode 14, for example. Welding electrode 14 comprises a spherical calotte-shaped seat 15 for the ball 14. A vacuum channel 16, which terminates in the region of recess 15, is provided in the interior of hollow welding electrode 14. When a ball 13 is removed from the magazine, a vacuum is applied to vacuum channel 16, and a ball 13 is suctioned onto calotte-shaped seat 15 and retained there. Using welding electrode 14, ball 13 is subsequently positioned on ground electrode 7 and is connected to ground electrode 7 at the desired point by way of resistance welding. Finally, welding electrode 14 is lifted off of ball 13. This state is shown in FIG. 2.

After the resistance-welding process, ball 13 is shaped by stamping. The shaping by stamping will be explained with reference to FIG. 3. A compression punch 17 is provided, which is advanced toward ball 13 in the direction of ground electrode 7, and so at least a region of the ball 13 extending beyond the electrode surface 11 is shaped. Compression punch 17 is pressed onto ball 13 so far that precious metal component 9 subsequently projects from electrode surface 11 by a predefined height H. Finally, compression punch 17 is lifted off of precious metal component 11. This state is shown in FIG. 3. The surface of precious metal component 9, which was originally spherical, is provided with a planar surface 18 by way of stamping. An edge 19 is formed that surrounds planar surface 18. Planar surface 18 is oriented parallel to electrode surface 11.

After shaping precious metal component 9 by stamping, it is affixed to ground electrode 7 by way of laser beam welding, as depicted in FIG. 4. An alloy zone 20 thereby forms between precious metal component 9 and ground electrode 7, in which the materials of precious metal components 9 and electrode 7 mix. Precious metal component 9 is attached very securely to electrode 7 by way of alloy zone 20 and cannot become detached even in the presence of strong temperature fluctuations. The laser beam is indicated by arrows 21. During laser welding, laser beam 21 is oriented such that it preferably extends at a right angle or at least nearly at a right angle to electrode surface 11. Finished precious metal component 9, which projects outward in a heel-like manner, comprises a region having a diameter D and extending beyond electrode surface 11.

A variant of the shape-molding of ball 13 is depicted in FIG. 5. Ball 13 is reshaped into a shape that differs from that shown in FIG. 3. In addition to a planar surface 18, a region having a shape of a jacket surface 22 of a truncated cone is provided on precious metal component 9 depicted in FIG. 5. Planar surface 18 is delineated from jacket surface 22 of the truncated cone by an edge 19. In addition, a ridge 23 is integrally formed on the end of the conical region 22 facing the electrode 7. The compression punch 17 shown in FIG. 5 has a predefined shape in its region 24 which shapes the ball 13, the predefined shape corresponding to the desired final shape of precious metal component 9 having planar surface 18, conical surface 22, and ridge 23. The laser welding of precious metal component 9, which has been shaped by stamping according to FIG. 5, is depicted in FIG. 6. Ridge 23 is melted using laser beam 21 and, together with the melted basic material of ground electrode 7, forms alloy zone 20. Finished precious metal component 9 extends beyond electrode surface 11 by a height H and has a diameter D in the projecting region. In a variant that is not depicted, jacket surface 22 can be reshaped into a jacket surface of a cylinder.

A further variant of the shape of a precious metal component 9 is shown in FIGS. 7 and 8. In comparison to precious metal component 9 shown in FIG. 5, the precious metal component shown in FIG. 7 is reshaped into a more pointed shape. Planar surface 18 is reduced in size and conical surface 22 can have a smaller cone angle.

Particularly good results are obtained in all of the variants described when height H is in the range 0.1 mm to 1.0 mm, in particular between 0.2 mm and 0.6 mm. Diameter D can be in the range 0.3 mm to 1.5 mm, wherein a diameter of 0.4 mm to 1.0 mm is preferred.

REFERENCE CHARACTERS

1 Spark plug
2 Inner conductor
3 Insulator
4 Spark plug body
5 Thread
6 Center electrode
7 Ground electrode
8 Precious metal component
9 Precious metal component
10 Electrode surface of the center electrode
11 Electrode surface of the ground electrode
12 Copper core
13 Ball
14 Welding electrode
15 Seat
16 Vacuum channel
17 Compression punch
18 Planar surface
19 Edge
20 Alloy zone
21 Laser beam
22 Jacket surface
23 Ridge
24 Shaping region of the compression punch
A Distance
D Diameter
H Height

The invention claimed is:

1. A method for manufacturing a spark plug comprising an inner conductor, an insulator enclosing the inner conductor, a spark plug body enclosing the insulator, and two electrodes, of which the first electrode is a center electrode connected to the inner conductor in an electrically conductive manner, and the second electrode is a ground electrode connected to the spark plug body in an electrically conductive manner, in which a separately prefabricated precious metal component is positioned on one of the electrodes, is thereafter connected to the electrode by way of resistance welding, and is subsequently affixed by way of laser or electron beam welding, so that the precious metal component extends like a heel beyond the electrode surface next to the precious metal component, wherein a ball is used as the precious metal component, and shaping of the precious metal component by stamping is carried out after the resistance welding and before the laser or electron beam welding, thereby reshaping at least a region of the ball protruding from the electrode surface.

2. The method according to claim 1, wherein the ball is shaped by stamping using a compression punch which presses onto the ball in the direction of the electrode, thereby reshaping that region of the ball extending beyond the electrode surface such that the precious metal component thereafter extends beyond electrode surface by a predefined height.

3. The method according to claim 1, wherein a region of the ball extending beyond the electrode surface is reshaped substantially into the shape of a planar surface.

4. The method according to claim 3, wherein the substantially planar surface is formed approximately parallel to the electrode surface.

5. The method according to claim 1, wherein by said shaping by stamping a region of the ball extending beyond the electrode surface is reshaped into a shape of a jacket surface of a cone, of a truncated cone, or of a cylinder.

6. The method according to claim 5, wherein by said shaping by stamping a ridge is formed on that end of the conical or cylindrical region facing the electrode carrying the conical or cylindrical region.

7. The method according to claim 6, wherein the ridge is melted thereon in the subsequent laser or electron beam welding process.

8. The method according to claim 2, wherein the compression punch in the region thereof that reshapes the ball has a predefined shape corresponding to the desired final shape of the precious metal component.

9. The method according to claim 1, wherein a hollow welding electrode is used for the positioning and resistance welding of the ball, which positions the ball on the ground electrode or on the center electrode, respectively, of the spark plug and welds it thereto.

10. The method according to claim 1, wherein the laser or electron beam extends approximately perpendicularly to the electrode surface during laser or electron beam welding.

11. A spark plug comprising an inner conductor, an insulator enclosing the inner conductor, a spark plug body enclosing the insulator, and two electrodes, of which the first electrode is a center electrode connected to the inner conductor in an electrically conductive manner, and the second electrode is a ground electrode connected to the spark plug body in an electrically conductive manner, in which a precious metal component is disposed on at least one of the electrodes and projects like a heel beyond the electrode surface next to the precious metal component, wherein the spark plug is manufactured by a method according to claim 1.

12. The spark plug according to claim 11, wherein the precious metal component projects beyond the electrode surface next to the precious metal component by a height of 0.1 mm to 1.0 mm, in particular 0.2 mm to 0.6 mm.

13. The spark plug according to claim 11, wherein a region of the precious metal component projecting beyond the electrode surface has a diameter of 0.3 mm to 1.5 mm, in particular 0.4 mm to 1.0 mm.

14. The spark plug according to claim 11, wherein the precious metal component is composed of platinum or a platinum alloy.

15. A method for manufacturing a spark plug comprising an inner conductor, an insulator, a spark plug body, a center electrode, a ground electrode and a spark gap, the method comprising the steps of:

positioning a precious metal component on at least one of the center electrode or the ground electrode;

resistance welding the precious metal component to the at least one electrode after it has been positioned, wherein the precious metal component is generally spherical shaped both before and after resistance welding;

stamping and reshaping the precious metal component on the at least one electrode after it has been resistance welded, wherein the precious metal component is reshaped to have a planar surface facing the spark gap; and laser or electron beam welding the precious metal component to the at least one electrode after it has been stamped and reshaped, wherein the planar surface of the precious metal component projects away from and is spaced from an alloy zone created during the laser or electron beam welding so that an edge exists between the planar surface and the alloy zone.

* * * * *